Nov. 29, 1966  J. R. FITZPATRICK  3,288,397
AIRCRAFT

Filed Nov. 10, 1964  9 Sheets-Sheet 1

INVENTOR.
JOHN R. FITZPATRICK
BY Albert Sperry

INVENTOR.
JOHN R. FITZPATRICK
BY Albert Sperry

FIG. 5

INVENTOR.
JOHN R. FITZPATRICK

INVENTOR.
JOHN R. FITZPATRICK
BY Albert Sperry.

FIG. 10

INVENTOR.
JOHN R. FITZPATRICK
BY Albert Sperry

FIG. 11

INVENTOR.
JOHN R. FITZPATRICK
BY Albert Sperry

FIG. 12

INVENTOR.
JOHN R. FITZPATRICK
BY Albert Sperry

United States Patent Office 3,288,397
Patented Nov. 29, 1966

3,288,397
AIRCRAFT
John R. Fitzpatrick, Levittown, Pa., assignor to Aereon Corporation, King of Prussia, Pa., a corporation of Pennsylvania
Filed Nov. 10, 1964, Ser. No. 410,180
9 Claims. (Cl. 244—29)

This application is a continuation-in-part of application Serial No. 371,876 filed May 27, 1964 now Patent No. 3,180,588. This invention relates to lighter-than-air craft and to the control and propulsion thereof.

Lighter-than-air craft have heretofore been propelled by motor driven propellers and while numerous patents and drawings have illustrated dirigibles wherein a propeller is located at the rear or in substantial alignment with the longitudinal axis of the hull of lighter-than-air craft, no airship embodying such a construction is known to have ever been built or flown. Among the reasons that may account for the failure to produce and use airships having propulsion means located at the rear or aligned with the longitudinal axis of a hull of the airship are the difficulties encountered in mounting the motor and propeller in such a location and the presence of elevators, rudders or other control means which are normally positioned adjacent the rear of the airship hull. Thus, both rigid and non-rigid airships have actually employed propellers and power plants located beneath or at the sides of the airship hull and have required the use of added heavy framing and support members or catenaries for the engines and propellers. Moreover, the eccentric location of the propulsion means of the prior art creates dynamic instabilities by exerting a moment arm perpendicular to the longitudinal axis of the hull during conditions of thrust and reversing which complicate the control problems particularly during take off and landing. Because of these and other deficiencies of the prior art, it has been historically necessary to employ large ground crews when launching or mooring lighter-than-air craft.

The location of propellers adjacent the sides or beneath the hull of an airship also limits the size or diameter of the propeller or rotor employed since it is necessary to maintain adequate ground clearance and spacing of the propeller from the hull itself. Therefore, relatively small diameter, high speed propellers, of reduced aerodynamic efficiency must be employed. Moreover, the slip stream of the propeller impinges on the hull reducing the effective thrust thereof and in the event icing conditions are encountered, ice particles may be projected through the hulls and gas cells from the propeller blades causing serious damage to the airship. Further, the traditional propeller location requires larger hangars for docking.

In accordance with the present invention, these objections and limitations inherent in airship constructions of the prior art are overcome and constructions are provided which serve to improve the control and propulsion characteristics of the airship. These results are preferably attained by employing a novel type of propulsion and control means and by positioning and actuating the same in a manner to improve and simplify control of the airship.

Airships embodying the present invention may embody one or a plurality of hulls together with rudder and elevator means or control surfaces and the propulsion means used are rotatable about the longitudinal axis of one or more hulls. The construction thus provided renders it possible to employ a rotor of relatively large diameter due to its elevation above the ground and its location at a point remote from the sides of the airship hull or hulls. The stern location of the rotor coaxial with the longitudinal axis of the airship further serves to position it in the zone of greatest air density adjacent the tail cone of the hull so that improved thrust per horsepower is attainable and air is induced from the boundary layer about the surfaces of the airship. Furthermore, the slip stream does not impinge upon the surfaces of the hull although air is caused to flow over the control surfaces at the rear of the airship in a manner to substantially increase the effectiveness of the control surfaces.

A particular advantage of this combination and arrangement of the rotor with respect to the hull of the airship resides in the greatly increased turning and control moments developed for any given lateral or vertical forces developed by the rotor. These capabilities of the propulsion means are attained by imparting collective and/or selective pitch to the rotor blades and by mounting so that the angle or relative position of the plane of rotation of the rotor with respect to the longitudinal axis of the hull of the airship can be varied. As a result it is not only possible to control the direction in which the rotor thrust is applied for forward and reverse movement of the airship but it is also possible to exert thrust in selected vertical or horizontal directions for control, balancing and stabilizing in flight and during take-off and landing operations.

Accordingly, the principal objects of the invention are to provide a novel type of airship control and propulsion means, to increase the efficiency of the propulsion means employed in lighter-than-air craft, to coordinate the operation of the propulsion means and control surfaces in a novel manner, and to improve and simplify the operations of propelling, controlling, steering, stabilizing and handling lighter-than-air craft.

These and other objects and features of the present invention will appear from the following description thereof wherein reference is made to the figures of the accompanying drawings.

Figure 1:
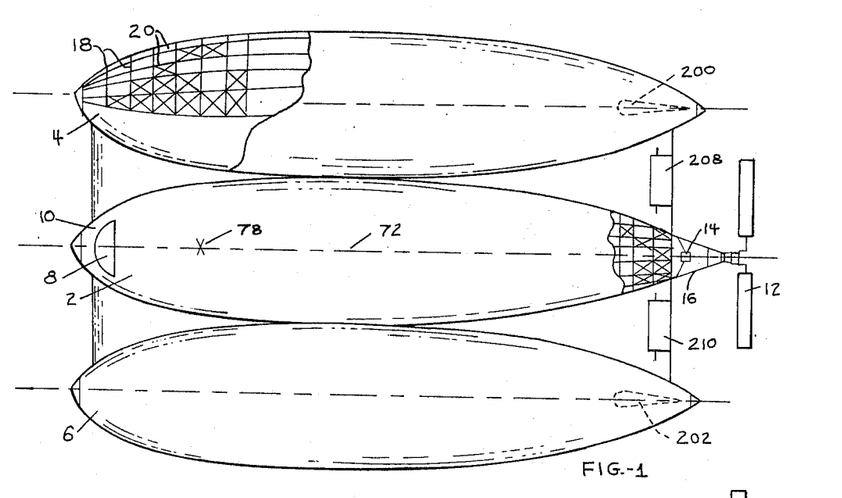
FIG. 1 is a top plan view of a typical form of airship embodying the present invention.
Figure 2:
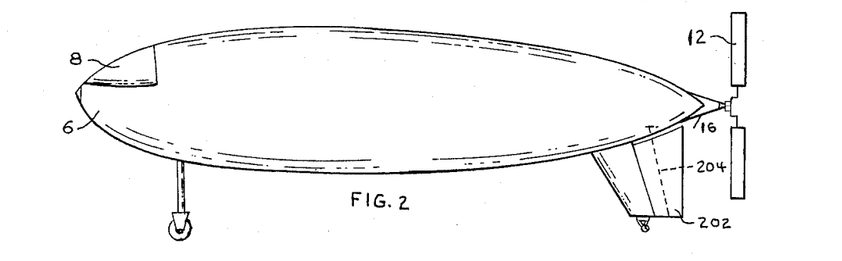
FIG. 2 is a side elevation of the airship illustrated in FIG. 1.
Figure 3:
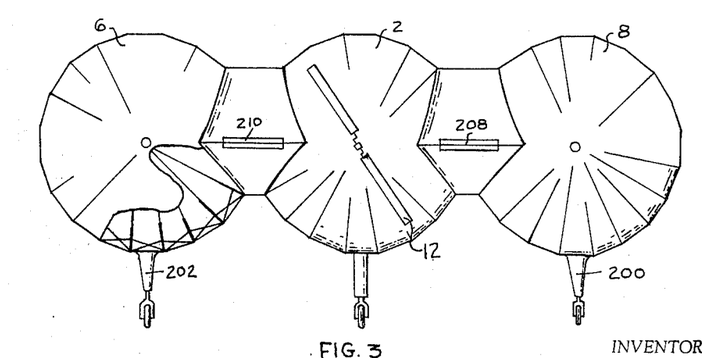
FIG. 3 is a rear elevation of the airship shown in FIGS. 1 and 2.

In that form of the invention chosen for purposes of illustration in the drawings, the airship is of a multiple hull type such as that shown and described in copending application Serial No. 371,876. For this purpose, the aircraft preferably is provided with three elongated hulls having their longitudinal axes substantially parallel and preferably lying in a common horizontal plane. The central hull 2 of the airship illustrated may be somewhat longer than the outer hulls 4 and 6 positioned on opposite sides thereof. The control cabin 8 is preferably located adjacent the nose 10 of the central hull 2, whereas, the rotor 12 is preferably located adjacent the rear end of the hull 2 and is driven by a motor 14 located within the motor housing 16 at the rear of hull 2.

The hulls 2, 4 and 6 of the aircraft preferably are each provided with a framework as disclosed in application Serial No. 371,876 including ring assemblies 18 and longerons 20. The portions of the longerons extending about the rear motor housing 16 have the rear ends thereof connected to a terminal element 22.

Figure 4:
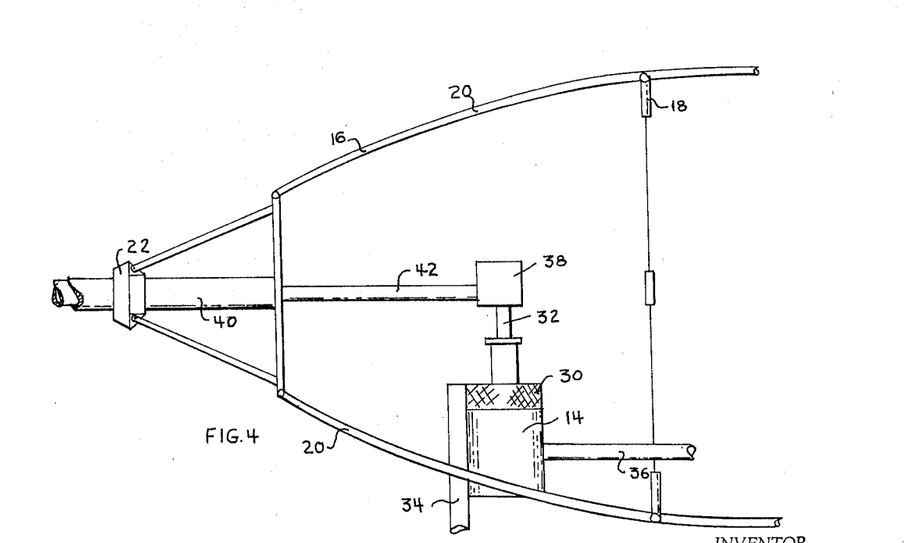
FIG. 4 is a diagrammatic side view partly in section illustrating a typical arrangement of a motor mounted in the rear end of the airship.

The motor 14 employed may be of any suitable type such as a reciprocating motor, turbine type motor, electrically driven motor or the like. Furthermore, if the waste heat of the motor is to be utilized to vary or control the temperature of gas and air contained within the hulls 2, 4 and 6, the motor may be provided with air cooling means such as a blower 30 driven from the power shaft 32 of the motor and provided with suitable air inlet and outlet ducts 34 and 36 respectively. The air inlet duct 34 leads to the exterior of the motor housing 16 for drawing in cooling air from the exterior of the hull, whereas, the hot air duct 36 may communicate with the hulls of the airship, if desired, to control the temperature of the air and buoyant gas therein.

Since the power shaft of the motor will generally rotate at a speed substantially in excess of the speed at which the rotor 12 is to be driven, reduction gearing 38 is interposed between the motor power shaft 32 and the shaft 40 by which the rotor 12 is driven. The rotor drive shaft 40 extends rearwardly from the motor housing 16 through a shaft tube 42 which is supported by the terminal element 22 of the aircraft framework. Suitable thrust bearings (not shown) are provided between the drive shaft 40 and shaft tube 42 to take up the end thrust of the rotor on the rotor shaft whereby the thrust will be transmitted to the terminal element 22 and adjacent portions of the airship framework at the rear of the central hull 2 and in alignment with the longitudinal axis thereof.

Figure 5:
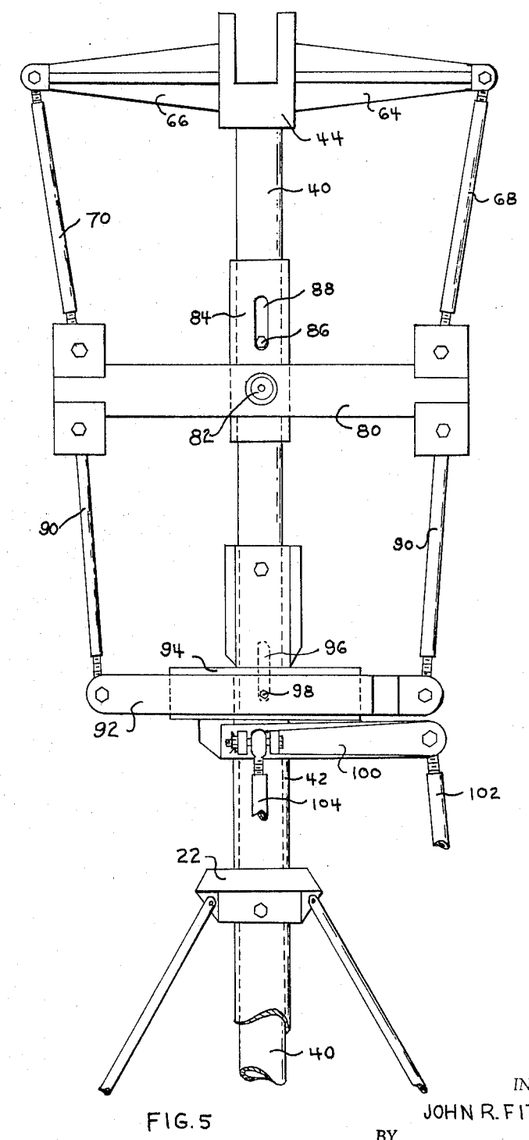
FIG. 5 is a plan view illustrating a typical rotor control assembly adapted for use in the present invention.
Figure 6:
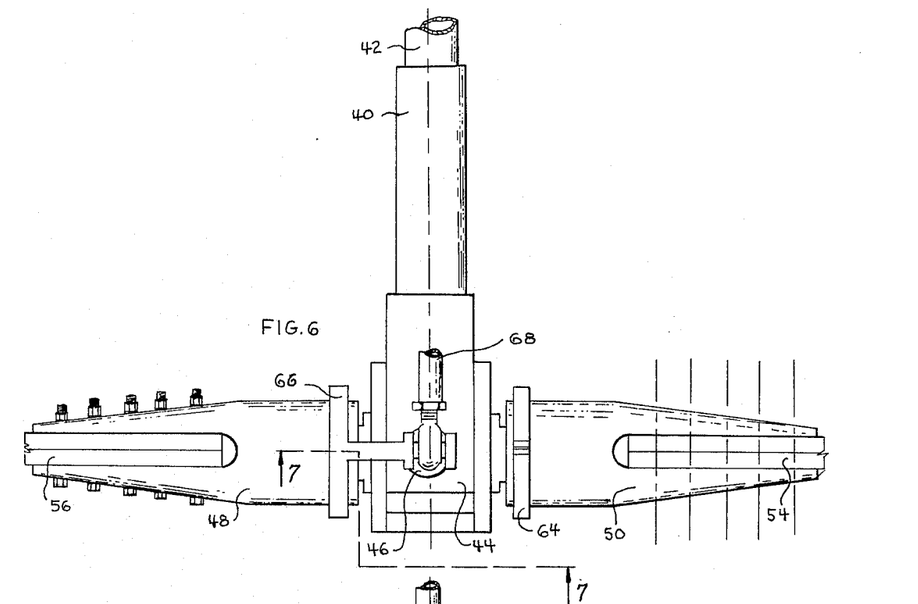
FIG. 6 is an enlarged view of the mounting means for the rotor blades.
Figure 7:
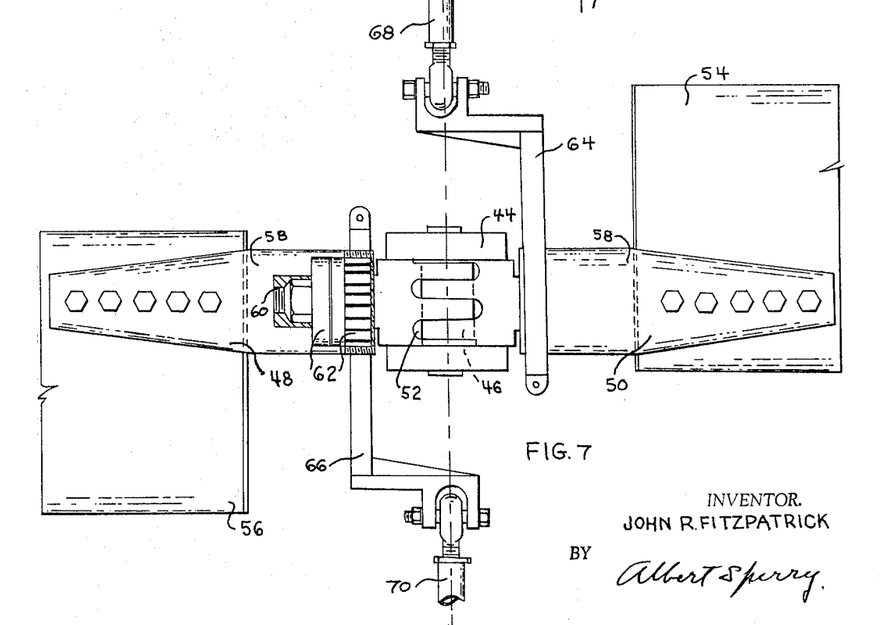
FIG. 7 is a sectional view of the construction shown in FIG. 6 taken on the line 7—7 thereof.

As shown in FIGS. 5, 6 and 7, the rear end of the rotor drive shaft 40 is provided with a yoke 44 having a pivot pin 46 extending therethrough. Rotor blade mounting members 48 and 50 are provided at their inner ends with interleaved hinge members 52 surrounding the hinge pin 46. The rotor blades 54 and 56 of the rotor 12 are each provided at their inner end with a tubular hub 58 surrounding the outer end or axle portion 60 of the rotor blade mounting members 48 and 50. The blades are rotatable about the axle portions of the rotor blade mounting members on bearings 62 to vary the pitch of the blades during rotation. For this purpose, the hubs 58 of the blades 54 and 56 are provided with horns or actuating arms 64 and 66 respectively which extend in diametrically opposite directions with respect to the axis of rotation of the drive shaft 40. The outer ends of the actuating arms 64 and 66 are positioned in alignment with the axis of the pivot pin 46 on opposite sides of the yoke 44 and have pitch control rods 68 and 70 respectively connected thereto.

Figures 8, 13, 14:
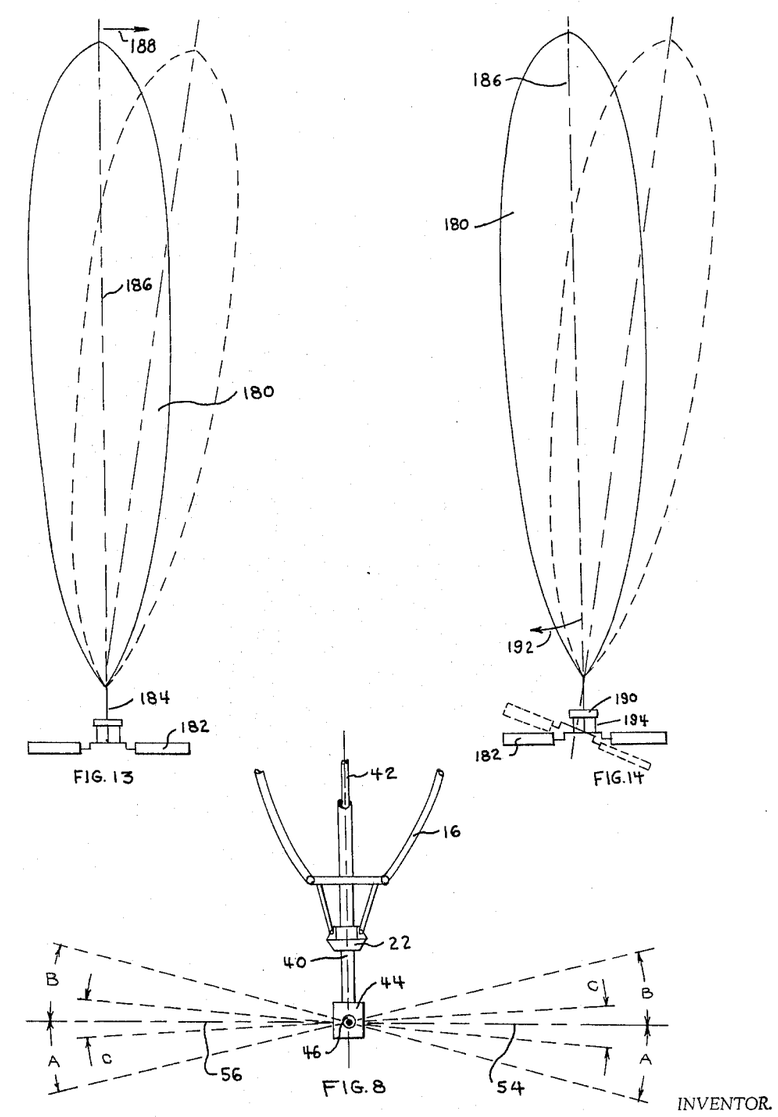
FIG. 8 is a diagrammatic plan view of the rotor and its mounting.
FIGS. 13 and 14 are diagrammatic illustrations indicating various functional characteristics of the rotor.

The construction thus provided renders it possible to vary the pitch of the blades of the rotor blades either collectively or differentially as desired. At the same time, the rotor blades are pivotally movable relative to the rotor drive shaft in a manner to relieve the blade bending moments which would otherwise be exerted on the blades if they were mounted for rotation in a fixed plane or at a fixed coning angle with respect to the drive shaft 40. Thus, as shown in FIG. 8, on propulsion of the airship in a forward direction, the thrust exerted by the blades 54 and 56 will tend to cause them to swing about the pivot pin 46 in a forward direction to a coning angle such as that indicated at B in FIG. 8. On the other hand, if the thrust exerted by the rotor blades is applied to move the airship in a reverse direction, the rotor blades will tend to swing rearwardly about the pivot pin 46 to a coning angle such as that indicated at A in FIG. 8. However, in either case, tension exerted on the rotor blades due to the centrifugal forces developed as they rotate will tend to cause the blades to extend radially outward in a plane at right angles to the axis of rotation of the rotor shaft 40. As a result, the rotor blades will have a free floating action and will actually assume positions during rotation wherein they have a very limited coning angle such as that shown at C in FIG. 8. The tangent of this angle will be the resultant of the thrust forces exerted on the blades due to their angle of attack and velocity, divided by the tension exerted on the blades by centrifugal forces and depending upon the length and weight, or distribution of the weight of the rotor blade and its speed of rotation. The rotor blades can be collectively controlled to vary their pitch by means of the pitch control rods 68 and 70 so as to vary the amount and direction of the thrust exerted by the rotor at any desired speed of rotation of the rotor.

The rotor of the present invention is further utilized for steering, control and stabilizing of the airship by varying the direction in which its thrust or propulsion forces are applied with respect to the longitudinal axis of the airship. This effect is attained by differentially varying the pitch of the rotor blades 54 and 56 through operation of the pitch control rods 68 and 70. Thus as illustrated diagrammatically in FIG. 9, the pitch of the blade (54) while on the right-hand side of the longitudinal axis 72 of the airship hull 2 and rotor shaft 40 can be increased while the pitch of the blade (56) while on the left-hand side of the axis 72 may be decreased. When this occurs, the thrust exerted by the blade (54) on the right of the axis may be represented by the length of the vector arrow 74 whereas the thrust exerted by the blade (56) which is then on the left-hand side of the axis may be represented by the length of the vector arrow 76. Since these forces are not equal and would tend to create an unstable condition, the pivotally movable rotor blades will automatically change their relative positions to restore equilibrium by equalizing the forces applied thereto. The blades will accordingly swing about the pivot pin 46 until they assume positions such as that indicated in dotted lines in FIG. 9 wherein they rotate in a plane which is tilted with respect to the axis 72 and the thrust vectors 74A and 76A are equalized and substantially equal pitch and angle of attack of the blades 54 and 56 is restored.

The laterally directed thrust thereby applied to the airship produces a very large turning moment about the center of gravity of the airship by reason of the fact that the rotor is located adjacent the rear end of the hull whereas the center of gravity will normally be located near the center or forward portion of the hull 2 as indicated at 78 in FIG. 1. Accordingly, the effectiveness of the control attained is such that relatively limited change in direction of the thrust plane of the rotor is required to steer, control and stabilize the airship. Moreover, the thrust plane can be tilted either horizontally or vertically throughout 360° about the longitudinal axis 72 for vertical or horizontal control in take-off, landing or while the airship is in flight.

It may also be noted that when the differential pitch of the blades 54 and 56 is initiated to effect such steering and control of the airship, the compensating or balancing effect of the rotors is immediately and automatically initiated so that continued differential pitch operation of the rotor blades does not occur. Thus, the action of the rotor employed in accordance with the present invention differs fundamentally from that of a helicopter rotor despite the fact that the construction thereof is superficially similar.

The mechanism employed for varying the pitch of the rotor blades also may be similar to that employed in actuating the blades of the helicopter rotor. A typical construction of this type is illustrated in FIGS. 5, 10, 11 and 12 of the drawings. As there shown, the pitch control rods 68 and 70 are connected at one end by universal points to the actuating arms 64 and 66 mounted on the hubs of the rotor blades 54 and 56 respectively. The opposite ends of the pitch control rods are pivotally connected to the opposite ends of a cross beam 80 pivotally mounted at 82 on a sleeve 84 rotatable with the rotor shaft 40. The sleeve 84 and cross beam 80 are slidably movable longitudinally of the rotor shaft 40 within the limits permitted by a pin 86 carried by the rotor shaft and extending into a slot 88 in the sleeve 84.

The cross beam 80 is tiltably movable about the pivot 82 on sleeve 84 by means of links 90 which are each connected at their opposite ends to opposite sides of a rotatable swash plate 92. The swash plate is mounted for rotation about a gimbal ring 94 supported on the rotor shaft tube 42 and tiltably movable with respect thereto. At the same time, the gimbal ring and swash plate are movable axially with respect to the shaft tube 42 between the limiting positions established by a slot 96 in the shaft tube and a pin 98 carried by the gimbal ring. A spider 100 is connected to the gimbal ring and a pitch control rod 102 is connected to the spider to tilt the gimbal ring about a horizontal axis normal to the axis of rotation of the rotor shaft. In addition, the spider 100 is provided with means for the connection of rods 104 thereto for tilting the gimbal ring about a vertical axis, and it will be apparent that combined movement of rods 102 and 104 will serve to tilt the gimbal ring into any desired plane transverse to the axis of rotation of the drive shaft 40. At the same time, the construction is operable to move the gimbal ring, links 90 and cross beam 80 back and forth axially of the rotor shaft 40 for varying the pitch of the rotor blades 54 and 56.

Figure 10:
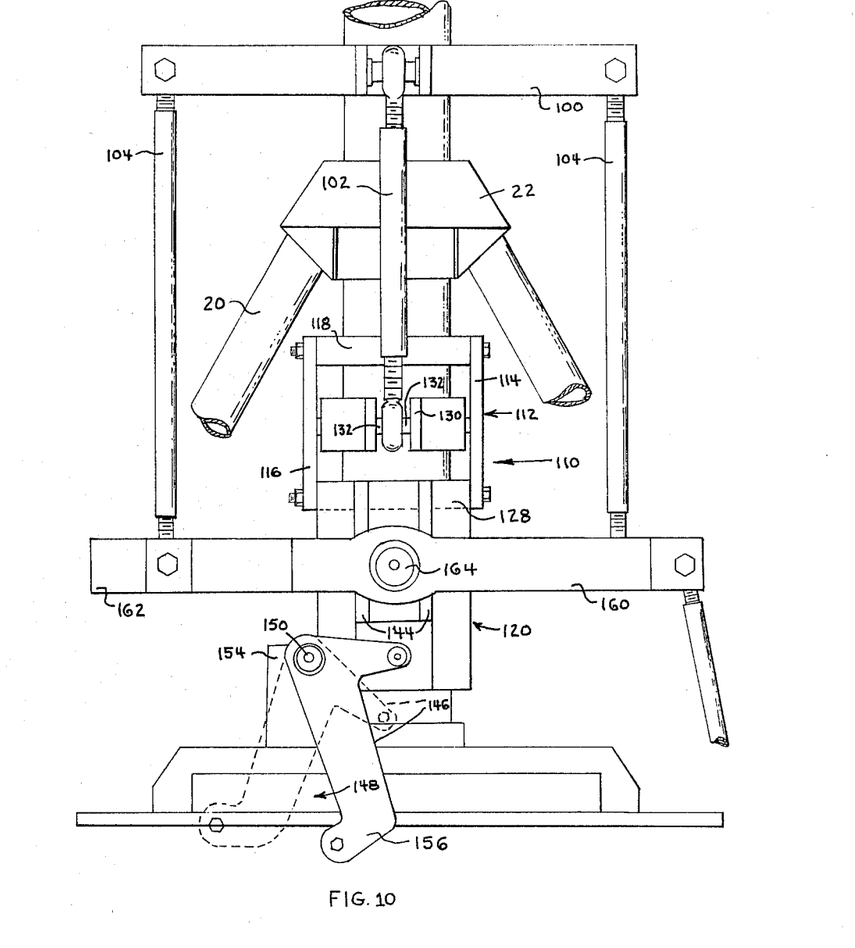
FIG. 10 is an enlarged top plan view of a portion of the assembly shown in FIGS. 4 and 5.
Figure 11:
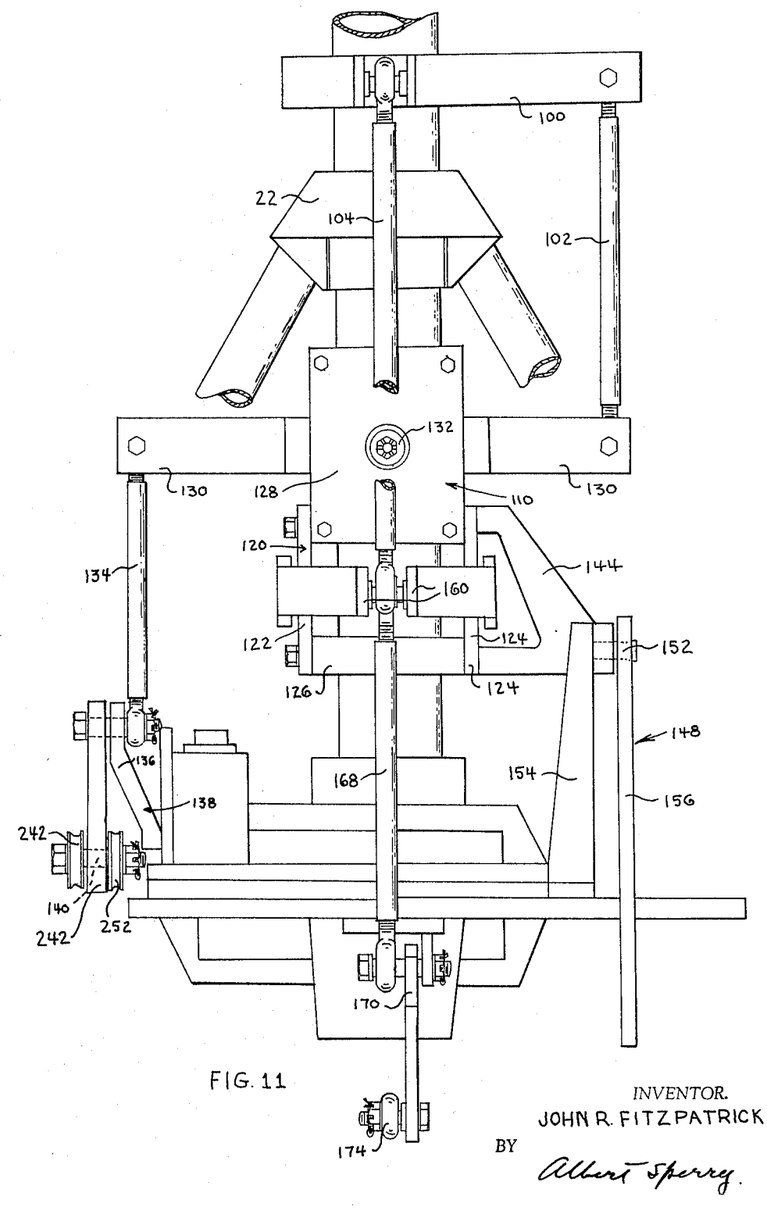
FIG. 11 is an enlarged side elevation of the portion of the assembly shown in FIG. 10.
Figure 12:
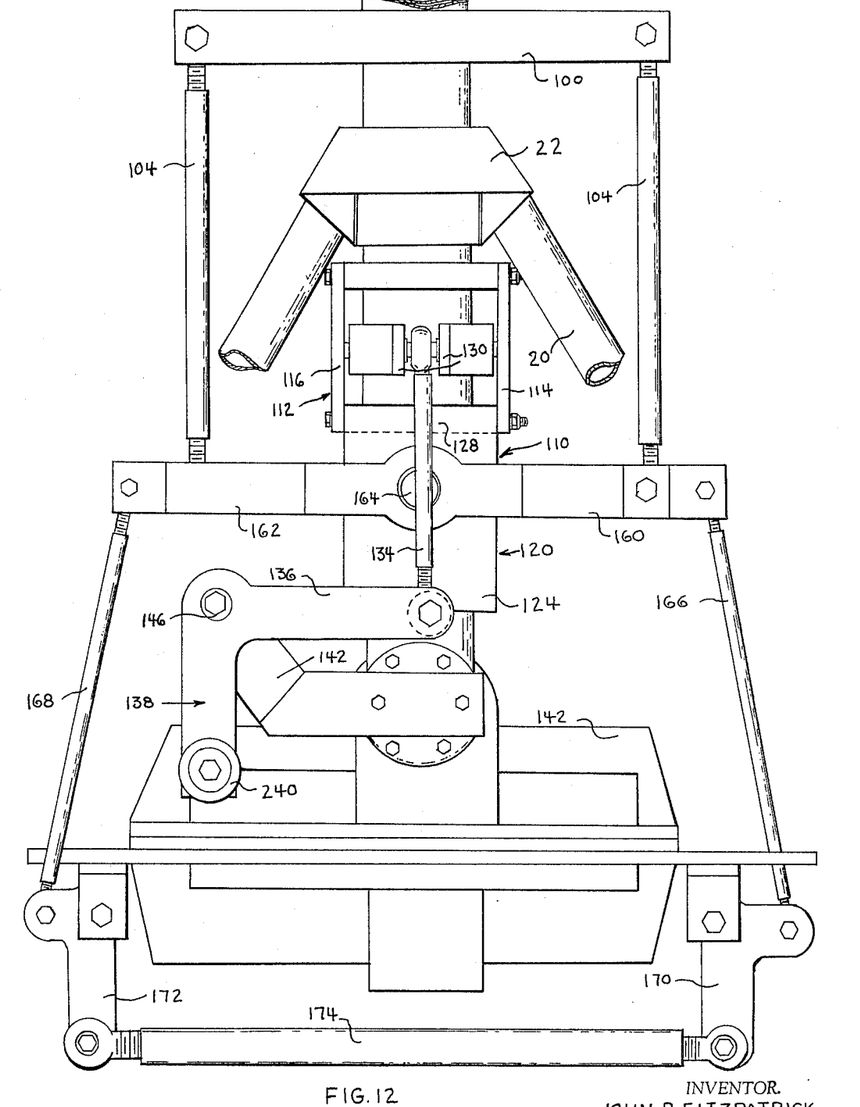
FIG. 12 is an enlarged view of the portion of the assembly shown in FIG. 10 as seen from the bottom.

Typical and preferred means for controlling the movement of the gimbal ring to effect the desired collective, selective or combined movement of the rotor blades 54 and 56 include a control supporting means 110 mounted on the rotor shaft tube 42 and slidably movable axially thereof. The control supporting means includes a rear portion 112 embodying two parallel vertical plates 114 and 116 secured to a rear block 118 and a forward portion 120 embodying two parallel horizontal plates 122 and 124 secured to a forward block 126. The adjacent ends of the plates 114, 116 and 122, and 124 of the rear and forward portions of the control supporting means 110 are secured to the vertical and horizontal sides respectively of a central block 128 so that the two portions of the supporting means form a unitary assembly movable axially along the rotor shaft tube 42.

The rear portion 112 of the control supporting means is provided with vertically extending strips of material which cooperate to form a selective pitch controlling arm 130. The arm 130 is pivotally mounted adjacent its center on hinge pins 132 carried by the vertical plates 122 and 124 and has one end of the pitch control rod 102 of the spider 100 connected thereto. The opposite end of arm 130 has a rod 134 connected thereto and extending to the arm 136 of a bell-crank lever 138 mounted for movement about a pivot pin 140 positioned on a stationary support 142 secured to the framework of the central hull 2.

The plate 124 of the forward portion 120 of the control supporting means 110 has a bracket 144 secured thereto and projecting upward therefrom. The arm 146 of a bell-crank 148 is connected to the bracket 144 at 150 and the bell-crank itself is pivoted at 152 on a stationary support 154 secured to the aircraft frame. The other arm 156 of the bell-crank 144 is movable to shift the control supporting means 110 axially along the rotor shaft tube 42. Pivotal movement of the bell-crank 148 is therefore utilized to move the control supporting means 110 back and forth axially along the rotor shaft tube 42.

Further in order to transmit such longitudinal movement of the control supporting means 110 to the spider 100 and gimbal ring 94 to move it axially of the rotor tube for varying the pitch of the rotor blades simultaneously and when the gimbal ring is in any angular position relative to the rotor shaft tube 42, the pitch control rods 104 are connected to the outer ends of arms 160 and 162 pivotally mounted at their inner ends on the plates 122 and 124 respectively of the rear portion 120 of the control supporting means as indicated at 164.

Movement of the outer ends of the arms 160 and 162 may also be utilized to vary the angular relation of the gimbal ring with respect to a vertical axis normal to the rotor shaft and tube for selective pitch variation of the rotor blades in coordination with movement of control surfaces of the airship. For this purpose, the outer ends of the arms are connected by links 166 and 168 to bell-cranks 170 and 172 respectively. The latter bell-cranks are connected together by a tie rod 174, whereby the arms 160 and 162 may be caused to move in opposite directions about their pivot points 164 in any position of the control supporting means 110 relative to the shaft tube 42.

The means thus provided may be actuated to tilt the gimbal ring either vertically or horizontally or in a combined manner for varying the pitch or angle of attack of the rotor blades and to vary the relative positions of the blades for selective movement thereof in any desired arc of 180° throughout their entire 360° of rotation. The blades are, therefore, capable of such variation in pitch that the amount of thrust and the location of the arc of greatest thrust of the blades during rotation can be varied at will to assure the most effective control of the airship. Furthermore, the changes in position of the plane of rotation of the blades of the rotor with respect to the axis of rotation of the rotor drive shaft and the longitudinal axis of the hull of the airship afford a degree of freedom of the movement of the rotor which may be said to uncouple the rotor from the drive shaft while still being so controlled as to assure its most effective operation.

Figure 9:
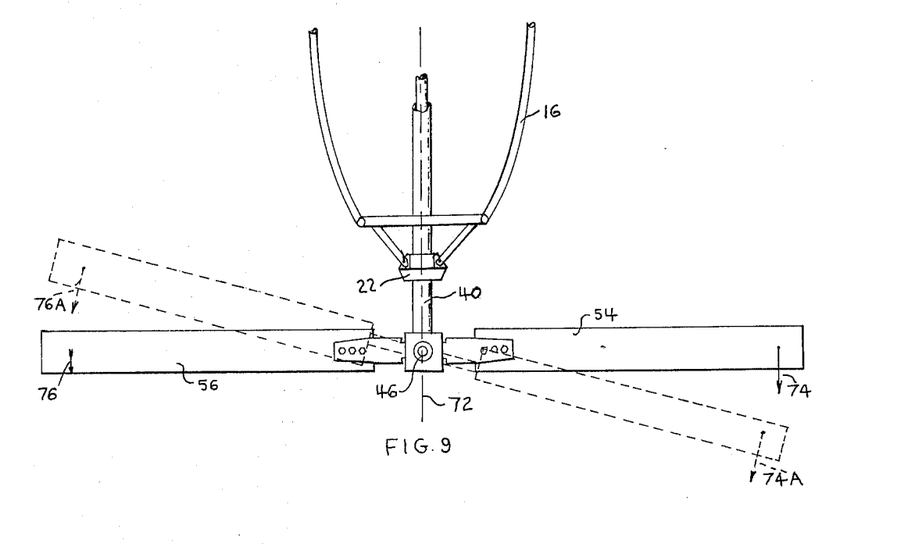
FIG. 9 is a further diagrammatic plan view of the rotor and its mounting.

Such controlled freedom of movement of the rotor not only serves to permit more effective control of the airship as described with reference to FIG. 9 but also serves to preclude the application of powerful and destructive forces to the rotor drive shaft due to the torque which would otherwise be exerted thereon as a result of the gyroscopic forces developed by the rotating rotor blades. This advantage is illustrated by the diagrams of FIGS. 13 and 14 wherein FIG. 13 illustrates an airship having a single hull 180 with a rotor 182 and drive shaft 184. The rotor is mounted at the rear and at right angles to the longitudinal axis 186 of the hull. If then a cross wind or other force represented by the arrow 188 should deflect the nose of the hull to a position such as that shown in dotted lines in FIG. 13, the gyroscopic forces developed by the rotor will tend to maintain the rotor in its original plane of rotation. Under such conditions, a rotor mounted in a fixed plane with respect to the drive shaft 184 and longitudinal axis 186 of the hull would exert a very powerful torque or bending moment on the drive shaft which might well be damaging. Moreover, the application of such a turning force to the rotor would tend to cause the rotor to precess in response to the gyroscopic action of the rotor and exert a force in a direction at right angles to its axis of rotation and in a vertical direction which would cause the tail of the airship to move upward or downward rendering the airship difficult to control.

If on the other hand, the rotor is mounted so as to afford the desired freedom of movement without suitable control, the rotor would remain in its original plane of rotation as shown in full lines in FIG. 14 although the hull assumes the dotted line position as shown in FIG. 14. It then would exert a lateral turning force on the hull as represented by the arrow 192 which in turn would serve to aggravate the condition thus encountered and further deflect the airship from its original full line position of flight rendering it practically unmanageable. However, as shown in FIG. 14, when the rotor is controlled in accordance with the present invention, a lateral deflection of the nose of the hull 180 from the full line to the dotted line position will be accompanied by movement of the gimbal ring 190 with the hull and with respect to the plane of rotation of the rotor 182. The pitch control rods 194 of the assembly will then move with the hull as it is deflected and serve to increase the pitch of the rotor blade on the right-hand side of the longitudinal axis of the hull (as shown in FIG. 9 and described above) whereby the plane of rotation of the rotor will automatically shift to the dotted line position shown in FIG. 14. The rotor then will be caused to exert a forward thrust an axial alignment with the longitudinal axis of the airship in its displaced or dotted line position and will not be influenced be externally applied or uncontrolled forces or movement of the airship. The rotor will instead faithfully follow the movements of the airship hull in a manner to aid in stabilizing and controlling the same.

In order further to utilize the mounting and control of the rotor or propulsion means of the present invention, it is desirable to coordinate the movement and operation of the rotor blades with the control surfaces of the airship such as the rudders and elevators employed. For this purpose, control means represented diagrammatically in FIG. 15 may be employed. As shown in FIGS. 1, 2 and 3, the outer hulls 4 and 6 of the airship are provided with rudders 200 and 202 which extend vertically in alignment with the longitudinal axes of the hulls 4 and 6 respectively and are rotatable about substantially vertical axes 204 by means of control arms 206 shown in FIG. 15. Horizontally extending elevators 208 and 210 are located between the central hull 2 and the outer hulls 4 and 6 respectively are movable about horizontal axes 212 by means of the control arms 214.

Figure 15:
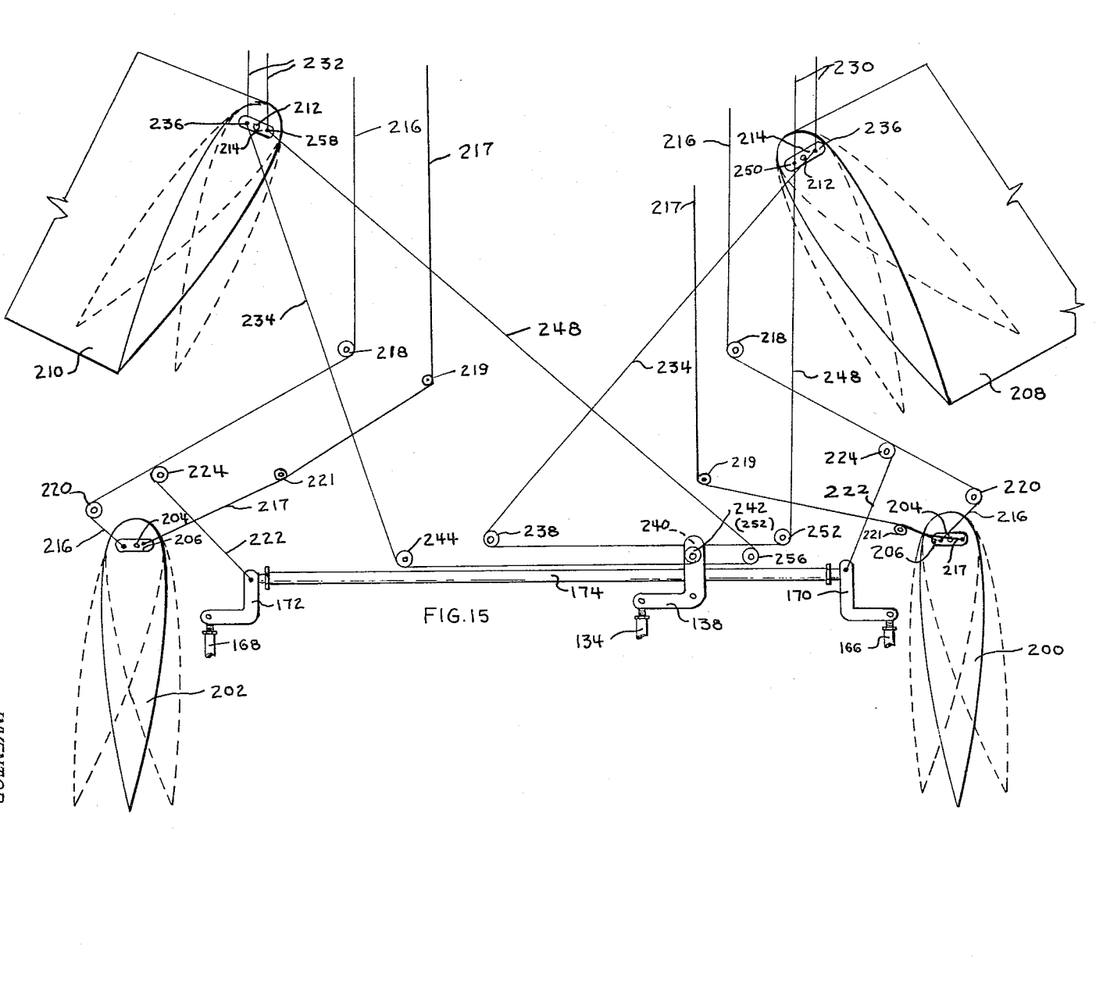
FIG. 15 is a diagrammatic illustration of typical means which may be employed for coordinating the operation of the rotor and control surfaces of the airship.

The rudders and elevators may be actuated by any suitable or preferred means such as mechanical, electrical or fluid operated devices, but as shown for purposes of illustration in FIG. 15, they are actuated by actuating cables which pass about sheaves for operation from the control cabin 8 in the nose of the central hull 2 of the ship.

The actuating cables 216 and 217 by which the rudders 200 and 202 are moved back and forth about their axes 204, pass about the sheaves 218 and 219 to sheaves 220 and 221 and are connected respectively to the opposite ends of the control arms 206 of the rudders. The rudders are ordinarily moved simultaneously and in the same direction so that the actuating cables 216 can each be provided with a lateral control cable or extension 222 that passes about one of the sheaves 224 so as to be connected to an arm of one of the bell-cranks 170 and 172. With this arrangement, the movement of the rudders 200 and 202 is coordinated with the movement of the bell-cranks 170 and 172, links 166 and 168 and the arms 160 and 162 pivotally mounted on the portion 120 of the control supporting means 110. Movement of the rudders in one direction or the other about their axes 204 will therefore also result in tilting of the spider 100 and gimbal ring 94 about a vertical axis to initiate an increase in the angle of attack of each rotor blade as it moves through an arc of 180° on one side of a vertical plane including the axes of rotation of the rotor shaft and decrease the angle of attack of each rotor blade as it moves through an arc of 180° on the opposite side of such a vertical plane. As a result, the thrust plane of the rotor will tilt as described above and shown in FIG. 9 so as to impart a turning moment and aid in steering the airship, thereby supplementing or augmenting the action of the rudders in any position to which they may be moved.

The elevators 208 and 210 may at times be actuated simultaneously and in the same direction to cause the airship to ascend or descend. However, they may in the alternative be moved in opposite directions for effecting trim or lateral control of the airship. Therefore, as shown in FIG. 15, the right elevator may be actuated by actuating cables 230 connected to the control arm 214 thereof whereas the left elevator may be actuated by actuating cables 232 connected to the control arm 214 of the left elevator. A control cable 234 extends from the "up" end 236 of control arm 214 of the right elevator 208 past the sheaves 238 and about a sheeve 240 carried by the arm 242 of bell-crank lever 138 as shown in FIGS. 12 and 15. From the sheave 240, the control cable 234 extends back past a sheave 244 to the "up" end 236 of the control arm 214 on the left elevator. In a similar way, the control cable 248 is connected to the "down" end 250 of the control arm 214 of the right elevator 208 past sheave 252 and about the second sheave 254 (FIG. 11) carried by the arm 242 of bell-crank lever 138. The control cable 248 then passes back past sheave 256 to the "down" end 258 of the control arm 214 of the left elevator.

With this construction, it will be apparent that during trim or lateral control of the airship or whenever the elevators are moved in opposite directions and through a similar angle, the control cables 234 and 248 will pay out on one side to the same extent that they are taken up on the other side. Therefore, they will merely move idly about the sheaves 240 and 254 on the bell-crank lever 138 without actuating the lever. However, when the elevators 208 and 210 are moved in the same direction or through unequal angles by operation of the actuating cables 230 and 232, the control arms 214 of the elevators will move in the same direction to cause control cable 234 to be taken up and control cable 248 to pay out (or vice-versa) and such movements will be equal. The pull of the control cables which is taken up in this manner will then cause the arm 242 of bell-crank lever 138 to be moved to the right or left through an arc proportional to the angle through which the elevators are moved. As a result, the bell-crank 138 will move the link 134 connected to arm 130 and the pitch control rod 102 to rock the gimbal ring 94 and swash plate 92 about a horizontal axis to vary the cyclic pitch of the blades of the rotor through an arc of 180° above or below the horizontal plane of the airship. Accordingly, the thrust afforded by the blades of the rotor will be complementary or related to the position and movement of the elevators so as to supplement or augment the action thereof.

The manner in which the rudders, elevators or other control surfaces of the airship are interrelated or coordinated, of course, does not require the use of control cables and actuating cables as described but can be effected by any other suitable means. Moreover, the control means employed may be employed simultaneously to attain combined effects and action of the control surfaces and rotor in the propulsion and control of the airship. It will also be apparent that the size, location, and shape of the control surfaces and rotor can be varied as desired to attain the most effective control characteristics in airships of any size, type and design.

In view thereof, it should be understood that the particular embodiments of the invention shown in the drawings and described above is intended to be illustrative only and is not intended to limit the scope of the invention.

I claim:

1. Lighter-than-air craft comprising an elongated hull with a longitudinal axis, propulsion means located at the rear of said hull and in substantial alignment with said longitudinal axis, means for varying the direction of the thrust on said hull by said propulsion means, said propulsion means embodying a drive shaft held in substantial alignment with the longitudinal axis of the hull, a rotor having a plurality of blades, a driving connection between the drive shaft and rotor including pivot means, said rotor blades being movable about said pivot means to vary the plane of rotation of said blades with respect to said drive shaft and the longitudinal axis of said hull, said blades further being movable about said pivot means and with respect to each other to vary the coning angle of the blades during rotation.

2. Lighter-than-air craft comprising an elongated hull having a longitudinal axis, a rotor mounted for rotation at the rear of said hull and embodying a plurality of blades movable to vary the pitch thereof, a drive shaft held in substantial alignment with the longitudinal axis of said hull, a driving connection between said drive shaft and rotor including pivot means about which the blades of said rotor are movable to different planes of rotation with respect to the drive shaft and longitudinal axis of the hull, and control means held in axial alignment with respect to said drive shaft and the longitudinal axis of said hull and spaced longitudinally of said axis from said pivot means, said control means being tiltable with respect to the longitudinal axis of the drive shaft and hull and connected to said blades for varying the pitch of the blades of the rotor.

3. Lighter-than-air craft as defined in claim 2 wherein the pitch of the blades of the rotor is differentially variable.

4. Lighter-than-air craft as defined in claim 2 wherein the pivot means is connected to the drive shaft and the rotor blades are independently movable about said pivot means to different coning angles with respect to the drive shaft.

5. Lighter-than-air craft having an elongated hull with a longitudinal axis, a rotor drive shaft rotatable about an axis in substantial alignment with said axis of the hull, a rotor having blades movable to vary the pitch thereof, a driving connection between said rotor and drive shaft including pivot means about which the rotor blades are movable to rotate in a plane at right angles to the drive shaft and in planes inclined with respect to the drive shaft, said blades being relatively movable about said pivot means to different coning angles and control means connected to the rotor blades and movable to vary the pitch of the blades.

6. Lighter-than-air craft as defined in claim 5 wherein the control means is rotatable with the rotor drive shaft and is movable with respect to said shaft to vary the pitch of the blades.

7. Lighter-than-air craft as defined in claim 5 wherein the control means is movable axially of the rotor drive shaft to collectively vary the pitch of the blades of the rotor.

8. Lighter-than-air craft as defined in claim 5 wherein the control means is pivotally movable with respect to the rotor drive shaft to differentially vary the pitch of the blades of the rotor.

9. Lighter-than-air craft as defined in claim 5 wherein said control means surrounds the rotor drive shaft and is rotatable therewith, said control means further being tiltable relative to the drive shaft to differentially vary the pitch of the blades of the rotor and vary the position of the plane of rotation of the blades with respect to the axis of rotation of the shaft and the longitudinal axis of the hull.

References Cited by the Examiner

UNITED STATES PATENTS

| | | | |
|---|---|---|---|
| 1,229,114 | 6/1917 | Menge et al. | 244—51 |
| 1,977,392 | 10/1934 | Mackenzie | 244—51 |
| 2,420,764 | 5/1947 | Zuck | 244—51 |
| 2,433,641 | 12/1947 | Young | 244—66 |
| 2,478,847 | 8/1949 | Stuart | 244—51 |
| 2,731,215 | 1/1956 | Avery | 244—17.19 X |

FOREIGN PATENTS 689,218   3/1953   Great Britain.

OTHER REFERENCES

Webster New International Dictionary, 2nd edition, 1938.

MILTON BUCHLER, *Primary Examiner.*

T. MAJOR, *Assistant Examiner.*